US012070682B2

(12) United States Patent
Baldwin et al.

(10) Patent No.: US 12,070,682 B2
(45) Date of Patent: Aug. 27, 2024

(54) 3D AVATAR PLUGIN FOR THIRD-PARTY GAMES

(71) Applicant: Snap Inc., Santa Monica, CA (US)

(72) Inventors: Dorian Franklin Baldwin, Toronto (CA); Jacob Edward Blackstock, Toronto (CA); Maoning Guo, Toronto (CA); David James Kennedy, Toronto (CA); Shahan Panth, Toronto (CA); Rahul Bhupendra Sheth, Los Angeles, CA (US); Leah Spontaneo, Scarborough (CA); Wenzhou Wang, Marina Del Rey, CA (US); Artem Yagodin, Playa del Rey, CA (US)

(73) Assignee: Snap Inc., Santa Monica, CA (US)

(*) Notice: Subject to any disclaimer, the term of this patent is extended or adjusted under 35 U.S.C. 154(b) by 0 days.

(21) Appl. No.: 16/824,373

(22) Filed: Mar. 19, 2020

(65) Prior Publication Data

US 2020/0306637 A1    Oct. 1, 2020

Related U.S. Application Data

(60) Provisional application No. 62/826,651, filed on Mar. 29, 2019.

(51) Int. Cl.
  *A63F 13/53*    (2014.01)
  *A63F 13/71*    (2014.01)

(52) U.S. Cl.
  CPC .............. *A63F 13/53* (2014.09); *A63F 13/71* (2014.09)

(58) Field of Classification Search
  CPC .. A63F 13/53; A63F 13/655; A63F 2300/5553
  See application file for complete search history.

(56) References Cited

U.S. PATENT DOCUMENTS

| 5,880,731 | A  | 3/1999 | Liles et al. |
| 6,023,270 | A  | 2/2000 | Brush, II et al. |
| 6,223,165 | B1 | 4/2001 | Lauffer |
| 6,772,195 | B1 | 8/2004 | Hatlelid et al. |
| 6,842,779 | B1 | 1/2005 | Nishizawa |
| 7,342,587 | B2 | 3/2008 | Danzig et al. |

(Continued)

FOREIGN PATENT DOCUMENTS

| CN | 109863532 | 6/2019 |
| CN | 110168478 | 8/2019 |

(Continued)

OTHER PUBLICATIONS

"International Application Serial No. PCT/US2020/024395, International Preliminary Report on Patentability mailed Oct. 14, 2021", 7 pgs.

(Continued)

*Primary Examiner* — James S. McClellan
(74) *Attorney, Agent, or Firm* — Schwegman Lundberg & Woessner, P.A.

(57) ABSTRACT

Systems and methods are disclosed for receiving a request to display an avatar within a graphical user interface of a client device, authenticating the request based on user data, retrieving the avatar from a database, transmitting the avatar to the client device and presenting the avatar within the user interface of the client device.

19 Claims, 13 Drawing Sheets

(56) References Cited

U.S. PATENT DOCUMENTS

| | | |
|---|---|---|
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres Del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,244,208 B1* | 3/2019 | Deng ................ G06K 9/00597 |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2005/0266907 A1* | 12/2005 | Weston ................ A63F 13/10 |
| | | 463/1 |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0113319 A1* | 4/2009 | Dawson ................ H04L 67/38 |
| | | 715/762 |
| 2009/0158170 A1* | 6/2009 | Narayanan ............ H04L 67/306 |
| | | 715/753 |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0053187 A1 | 3/2010 | Arrasvuori |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2016/0035061 A1 | 2/2016 | Gadre et al. |
| 2016/0134840 A1 | 5/2016 | Mcculloch |
| 2016/0234149 A1 | 8/2016 | Tsuda et al. |
| 2017/0069124 A1* | 3/2017 | Tong ....................... G06T 17/20 |
| 2017/0080345 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |

(56) References Cited

U.S. PATENT DOCUMENTS

| | | |
|---|---|---|
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0349108 A1* | 12/2018 | Brebner .......... H04W 4/80 |
| 2019/0001223 A1 | 1/2019 | Blackstock et al. |
| 2019/0004791 A1 | 1/2019 | Brebner |
| 2019/0057616 A1 | 2/2019 | Cohen et al. |
| 2019/0188920 A1 | 6/2019 | Mcphee et al. |

FOREIGN PATENT DOCUMENTS

| | | |
|---|---|---|
| CN | 113924152 A | 1/2022 |
| EP | 2184092 | 5/2010 |
| JP | 2001230801 | 8/2001 |
| JP | 5497931 | 3/2014 |
| KR | 20120018708 A | 3/2012 |
| KR | 101445263 | 9/2014 |
| WO | 2003094072 | 11/2003 |
| WO | 2004095308 | 11/2004 |
| WO | WO-2006053068 A2 | 5/2006 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |
| WO | WO-2020205326 A1 | 10/2020 |

OTHER PUBLICATIONS

"International Application Serial No. PCT/US2020/024395, International Search Report mailed Jul. 2, 2020", 4 pgs.

"International Application Serial No. PCT/US2020/024395, Written Opinion mailed Jul. 2, 2020", 5 pgs.

"European Application Serial No. 20720592.3, Communication Pursuant to Article 94(3) EPC mailed Nov. 3, 2023", 5 pgs.

"Korean Application Serial No. 10-2021-7034746, Notice of Preliminary Rejection mailed Sep. 7, 2023", w/ English Translation, 13 pgs.

* cited by examiner

3D AVATAR PLUGIN FOR THIRD-PARTY GAMES

PRIORITY

This application claims the benefit of priority to U.S. Provisional Patent application Ser. No. 62/826,651 filed Mar. 29, 2019, which is incorporated by reference herein in its entirety.

TECHNICAL FIELD

The present disclosure relates generally to avatar rendering across gaming platforms.

BACKGROUND

Avatars are widely used across many different applications with different resource needs (e.g., different processing power and storage requirements). For example, messaging applications use less device resources (e.g., less storage) than gaming applications, making more of the resources available for processing the avatars. This allows such messaging applications to provide avatars with a rich set of features with minimal impact on the user experience. Gaming applications, on the other hand, use a large amount of resources which need to be shared with avatar processing. Gaming applications therefore typically need to balance resource distribution between the game itself and avatar processing.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings, in which.

To easily identify the discussion of any particular element or act, the most significant digit or digits in a reference number refer to the figure number in which that element is first introduced.

DETAILED DESCRIPTION

Figure 1:
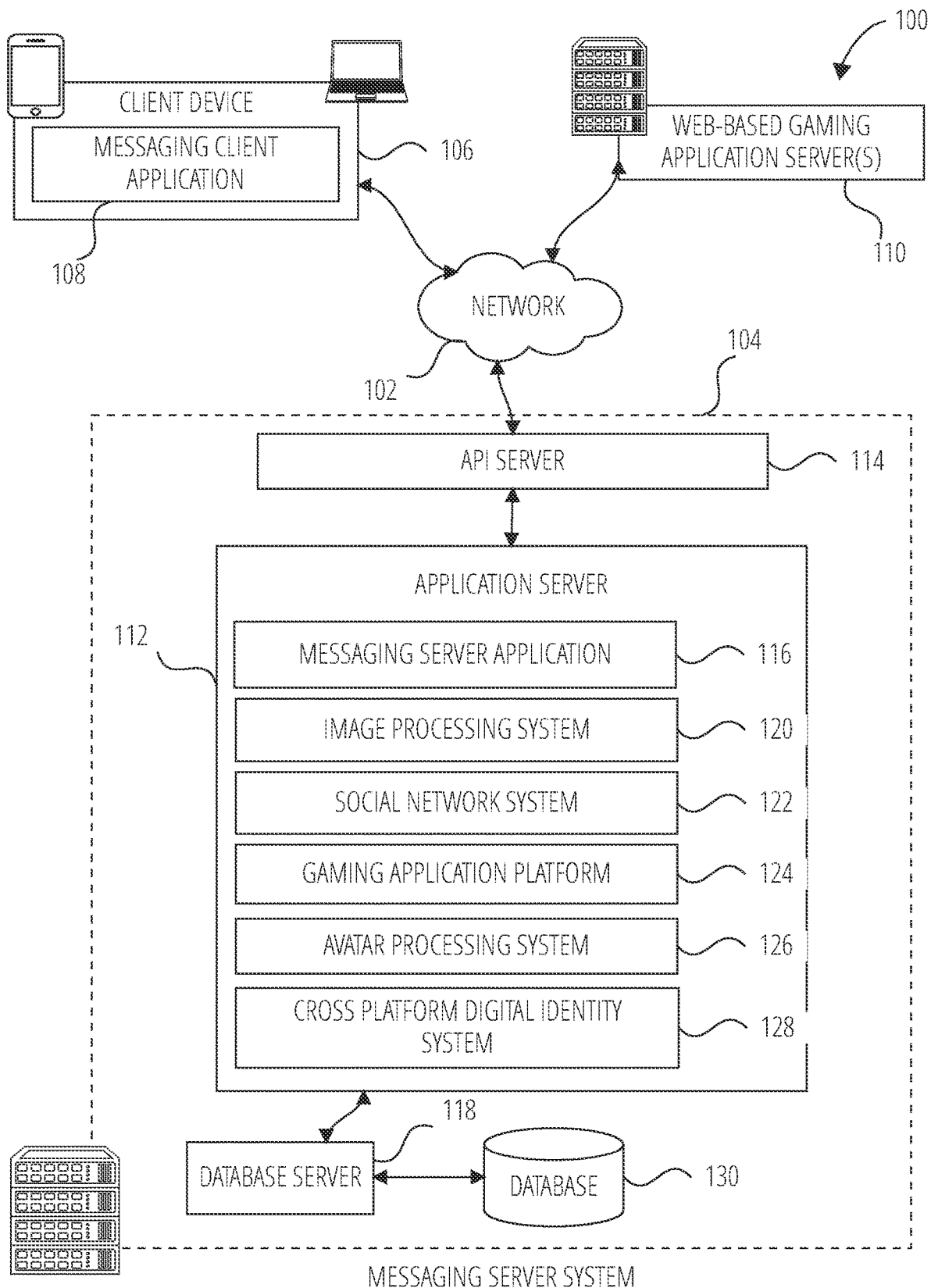
FIG. 1 is a diagrammatic representation of a networked environment in which the present disclosure may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Incorporating avatars into applications greatly enhances the overall user experience. This is especially true in multi-player video games where users are interacting and communicating with each other. Namely, using avatars to represent the users in the video games makes communicating and playing more fun and interesting for the players. As implementations of such games on mobile devices, which have limited resources available, grows in popularity, application developers seek to improve the graphics processing techniques used to incorporate the avatars into the games. Particularly, application developers seek ways to incorporate the avatars without sacrificing the user experience or introducing lag.

One such technique used by developers to incorporate avatars into the games involves reducing the level of detail of the avatars as a whole (e.g., reducing the visual quality of the avatars). While this technique makes more of the graphics engine resource of the mobile device available to the game, reducing the level of detail of the avatar as a whole still requires complex graphics processing operations related to 3D modeling to be performed. This limits the application of the technique to devices that have a large amount of available resources or to games that incorporate a small number of avatars (e.g., a single avatar). Namely, this technique may not be effective when applied to large multi-player video games where many avatars need to be incorporated (e.g., eight avatars are incorporated), particularly in mobile device.

The disclosed techniques improve the functionality of gaming application software and systems by reducing the amount of resources needed to incorporate multiple avatars (e.g., eight avatars) into a given application (e.g., a game). Particularly, the disclosed techniques reduce the level of detail of components of an avatar on a component-by-component basis. Avatars are typically constructed by combining various components (e.g., a rig, a geometric model, and textures). The rig includes a skeleton which has a number of bones or parts and represents how the different bones or parts interact with each other during animation. The geometric model is the three-dimensional surface representation of the avatar and can be referred to as a skin or mesh. The three-dimensional (3D) model represents a physical body using a collection of points in 3D space, connected by various geometric entities such as triangles, lines, and curved surfaces; further, each bone in the skeleton is associated with some portion of the geometric model. The textures of the avatar include more detailed features of the geometric model such as the skin color, hair color, glasses, etc. According to the disclosed embodiments, to reduce the amount of resources needed to incorporate multiple avatars, the number of bones in a skeleton of the avatar can be reduced separately (e.g., one at a time or in parallel using different processing elements) from the number of triangles in the geometric model of the avatar. Further, the bones in the rig corresponding to the facial hair, hat, head hair or glasses are embedded with the facial hair, hat, head hair, or glasses textures separately from the bones in the rig corresponding to the head or outfit textures of the avatar.

When a given application requests an avatar having certain components with a reduced level of detail, the already reduced level of detail components are retrieved and assembled into the requested avatar. This approach significantly reduces the overall resource requirements (e.g., processing and storage resource) an application needs to incorporate the avatar. Namely, unlike the conventional approach, in which the application has to reduce the level of detail of the avatar as a whole (e.g., during rendering and incorporation of the avatar), the application according to the disclosed embodiments simply requests that a server retrieve and assemble previously reduced level of detail components into an avatar to provide to the application. This enables multiple avatars (e.g., eight avatars) to be rendered and animated simultaneously for presentation to a user in a given game.

In certain embodiments, animation processing of the avatar is further optimized to make more of the processing and storage resources available to the application (e.g., the game) allowing for many more avatars to be incorporated. Specifically, according to the disclosed embodiments, animating an expression of the avatar (e.g., animating a change in expression of the avatar from happy to sad) is performed by retrieving a sequence of facial textures (e.g., a facial texture with the sides of the lips curved up, a facial texture with the sides of the lips straight, and a facial texture with the sides of the lips curved down) in the reduced level of detail that corresponds to the animated expression. The facial textures are assembled one at a time into the avatar in the reduced level of detail and swapped according to the sequence to animate the desired expression.

FIG. 1 is a block diagram showing an example messaging system 100 for exchanging data (e.g., messages and associated content) over a network. The messaging system 100 includes multiple instances of a client device 102, each of which hosts a number of applications including a messaging client application 106. Each messaging client application 106 is communicatively coupled to other instances of the messaging client application 106 and a messaging server system 110 via a network 108 (e.g., the Internet).

Accordingly, each messaging client application 106 is able to communicate and exchange data with another messaging client application 106 and with the messaging server system 110 via the network 108. The data exchanged between messaging client application 106, and between a messaging client application 106 and the messaging server system 110, includes functions (e.g., commands to invoke functions) as well as payload data (e.g., text, audio, video or other multimedia data).

Each messaging client application 106 is also able to communicate with one or more web-based gaming application server(s) 104. Each web-based gaming application server(s) 104 hosts an HTML-5 based game (or any other suitable web-based or markup-language-based game). Particularly, the messaging client application 106 launches a web-based game by accessing the HTML5 file from the web-based gaming application server(s) 104 associated with the game. In certain embodiments, the games hosted by the web-based gaming application server(s) 104 are programmed in JavaScript leveraging a software development kit (SDK) stored on the gaming application platform 126 provided by the messaging server system 110. The SDK includes application programming interfaces (APIs) with functions that can be called or invoked by the web-based gaming application. In certain embodiments, the gaming application platform 126 includes a JavaScript library that provides a given gaming application access to certain user data of the messaging client application 106. HTML5 is used as an example technology for programming games, according to some embodiments, but games programmed based on other technologies can be used.

In order to integrate the functions of the SDK into the game, the SDK is downloaded by the web-based gaming application server(s) 104 from the messaging server system 110 or is otherwise received by the web-based gaming application server(s) 104. Once downloaded or received, the SDK is included as part of the application code of the web-based game. The code of the web-based game can call or invoke certain functions of the SDK to integrate features of the messaging client application 106 into the web-based gaming application.

As an example, the user's avatar from the messaging application may be made available to the gaming application in response to the gaming application invoking a fetch-avatar-image function. Specifically, the gaming application may determine a need to include a user's avatar next to score information presented in the gaming application. In this scenario, the gaming application, after being launched, invokes the fetch-avatar-image function, which passes a message to the messaging application with the user's identification information. The messaging application then generates a response message that includes an image representing the user's avatar obtained from the messaging application (or a link to the avatar image) and provides the response to the gaining application through the gaming application platform 126. The gaming application then incorporates the user's avatar by displaying the avatar in the game interface.

In certain embodiments, the game may request via the SDK an avatar having a particular level of detail (e.g., a second level of detail that is lower than a first level of detail). In such cases, the game may specify components (e.g., textures including face and body textures) of an avatar along with a given level of detail. The gaming application platform 126 may process the request and retrieve components previously generated in the requested level of detail corresponding to the requested components. For example, the gaming application platform 126 may communicate with the avatar processing system 128 to obtain and generate a given avatar having the requested components in the requested level of detail. The avatar processing system 128 may assemble the requested components in the requested level of detail into an avatar and provide to the gaming application, via the gaming application platform 126, the requested avatar in the requested level of detail.

In some embodiments, the avatar processing system 128 stores avatar components in two or more levels of detail. In some embodiments, the avatar processing system 128 stores an assembled avatar, having a given identifier, in a first level of detail and each component of the assembled avatar in a second level of detail separately from the assembled avatar. For example, the avatar processing system 128 stores an avatar rig (skeleton) in a first level of detail having 216 bones and the same avatar rig in a second level of detail having 16 bones. Alternatively, the avatar processing system 128 stores the complete avatar already assembled in the first level of detail having the avatar rig and all other components of the avatar in the first level of detail and separately stores only the rig portion of the avatar in the second level of detail. The avatar processing system 128 stores an avatar model in a first level of detail having 10,000 triangles and the same model of the avatar in a second level of detail having 2000 triangles. Alternatively, the avatar processing system 128 stores the complete avatar already assembled in the first level of detail having the avatar model in the first level of detail and separately stores only the model portion of the avatar in the second level of detail. The avatar processing system 128 stores textures (e.g., facial hair, facial features, outfits, hat, glasses, etc.) of an avatar in a first level of detail having a full set of blend shapes and rich level of detail and the same textures in a second level of detail having minimal geometry and minimal level of detail. Alternatively, the avatar processing system 128 stores the complete avatar already assembled in the first level of detail having the textures in the first level of detail and separately stores only the textures of the avatar in the second level of detail. Namely, the textures in the first level of detail of the avatar are not stored separately from the assembled avatar in the first level of detail. Upon receiving a request, the avatar processing system 128 assembles an avatar (e.g., in a second level of detail) by retrieving a rig, model and textures corresponding to the second level of detail and assembling the individual components into the complete avatar in the second level of detail.

In some embodiments, the level of detail of each avatar component is reduced by the avatar processing system 128 separately from other avatar components. For example, the avatar processing system 128 retrieves the rig having 216 bones of a given avatar and reduces the level of detail of the rig to 16 bones separately from reducing the level of detail of the avatar model and/or textures of the avatar. The rig in the reduced second level of detail may be stored separately from the rig in the first level of detail. In some implementations, the rigs in both levels of detail may be associated with a same avatar reference or identifier. This allows a given application to request an avatar in a given level of detail by specifying an identifier of the avatar without having to specifically identify the lower level of detail rig corresponding to the requested avatar. In some embodiments, nomenclature of the rig pieces is preserved between the first and second levels of detail. Namely, the name of the head joint that is common to both the rigs in the first and second levels of detail may be kept the same. In this way, the same process for animating a rig having 216 bones can be used to animate a rig having 16 bones.

In some implementations, portions of the avatar rig in the second level of detail are separately associated with textures. For example, the head joint of the rig in the second level of detail is associated with facial hair, head hair, hats and glasses while the full rig of the avatar is associated with outfits and heads. This allows the avatar processing system 128 to quickly and efficiently assemble a given avatar in a second level of detail that is lower in detail than the avatar in a first level of detail by picking and choosing separate components of the avatar that are previously generated.

In some embodiments, the avatar processing system 128 retrieves a model of a given avatar and reduces the level of detail of the model separately from reducing the level of detail of the avatar rig and/or textures of the avatar. For example, the avatar processing system 128 retrieves a model of a given avatar having 10,000 triangles and reduces the level of detail of the model to 2000 triangles. In some implementations, the avatar processing system 128 receives user input specifying the number of triangles and vertices for the second level of detail. In response to receiving the user input, the avatar processing system 128 automatically retrieves the model of the avatar in the first level of detail and generates the model in the second level of detail having the number of triangles and vertices specified by the user input. The model in the reduced second level of detail may be stored separately from the model in the first level of detail. In some implementations, the models in both levels of detail may be associated with a same avatar reference or identifier. This allows a given application to request an avatar in a given level of detail by specifying an identifier of the avatar without having to specifically identify the lower level of detail model corresponding to the requested avatar.

In some embodiments, the avatar processing system 128 retrieves one or more textures of a given avatar and reduces the level of detail of the retrieved textures separately from reducing the level of detail of the avatar rig and/or model of the avatar. For example, the avatar processing system 128 retrieves clothing, body, face, facial hair and/or head hair in a first level of detail and reduces the level of detail by downsampling, resizing and quantizing the clothing, body, face, facial hair and/or head hair. The textures in the reduced second level of detail may be stored separately from the textures in the first level of detail. In some implementations, the textures in both levels of detail may be associated with a same avatar reference or identifier. This allows a given application to request an avatar in a given level of detail by specifying an identifier of the avatar without having to specifically identify the lower level of detail textures corresponding to the requested avatar.

In some embodiments, the avatar processing system 128 may store a newly assembled avatar in the requested level of detail for future requests. For example, the avatar processing system 128 may receive a request for an avatar having a specified level of detail (a second level of detail that is lower than a first level of detail). The avatar processing system 128 may determine whether the components of the avatar having the specified level of detail have previously been assembled and stored. In response to determining that the requested avatar having the specified level of detail components has been previously assembled and stored, the avatar processing system 128 may retrieve the previously assembled avatar and provide to the game via the gaming application platform 126 the avatar in the requested level of detail. In response to determining that the requested avatar has not been previously assembled and stored, the avatar processing system 128 may retrieve each component specified in the request that is in the specified level of detail and assemble the components into an avatar. The avatar processing system 128 may then return to the game the assembled avatar in the specified level of detail.

The SDK stored on gaming application platform 126 effectively provides the bridge between the web-based gaming application and the messaging client application 106. This provides the user with a seamless experience of communicating with their friends on the messaging client application 106, preserving the look and feel of the messaging client application 106 while playing a web-based gaming application. To bridge the web-based gaming application and the messaging client application 106, in certain embodiments, the SDK facilitates communication between the web-based gaming application server 107 and the messaging client application 106. In certain embodiments, a WebViewJavaScriptBridge running on a client device 102 establishes two one-way communication channels between the web-based gaming application and the messaging client application 106. Messages are sent between the web-based gaming application and the messaging client application 106 via these communication channels asynchronously. Each SDK function invocation is sent as a message, and callback for each SDK function is implemented by constructing a unique callback identifier and sending a message with that callback identifier.

In certain embodiments, each web-based gaming application server(s) 104 provides the HTML5 file corresponding to the web-based gaming application to the messaging server system 110. The messaging server system 110 can add a visual representation of the game in the messaging client application 106. The visual representation can be a box art of the gaming application or just text with the title of the gaming application. The box art (or cover art) includes an artwork as an illustration or photograph that visually identifies, describes, and/or promotes the gaming application. The box art is artistically connected to the gaming application and is created with art by the creator of the gaming application. Once the user selects the visual representation or instructs the messaging client application 104 through a GUI of the messaging client application 106 to launch the game (as discussed below), the messaging client application 106 obtains the HTML5 file and initiates all the resources necessary to launch the game. In some cases, the messaging client application 104 accesses the corresponding web-based gaming application server(s) 104 to launch the game.

The cross platform digital identity system 130 may be communicatively coupled with the messaging server application 116, image processing system 118, social network system 124, gaming application platform 126, and avatar processing system 128. The cross platform digital identity system 130 may comprise a software plug-in to allow use of a digital identity (e.g., an avatar) created and retrieved from the avatar processing system 128 in third-party systems and applications. A plug-in is a software that extends or changes the behavior or an interface of a software application external to the plug-in. For example, if a user wanted to use her avatar across multiple gaming platforms, the cross platform digital identity system 130 may allow a specific gaming platform to retrieve her avatar and display the avatar within a specific gaming application. This allows for a user to have a consistent digital identity across multiple game platforms. The cross platform digital identity system 130 may run from a web browser as a browser plug-in or on a client device 102. The cross platform digital identity system 130 may comprise a plug-in API which defines how third-party applications can interact with the cross platform digital identity system 130 and libraries which provides a given platform access to certain user data in the messaging client application 106.

The cross platform digital identity system 130 may receive a request from a gaming application to display an avatar associated with a user. The cross platform digital identity system 130 authenticates the user of the gaming application by comparing the credentials associated with the gaming application with user credentials associated with the messaging client application 106. Based on the authentication, the cross platform digital identity system 130 retrieves the avatar from the database 122. The cross platform digital identity system 130 transmits the avatar from the database 122 to the gaming application. The cross platform digital identity system 130 causes presentation of the avatar within the gaming application.

The cross platform digital identity system 130 may comprise an authentication system and a digital identity retrieval system. More details regarding the cross platform digital identity system 130 are described below in connection with FIG. 5.

The messaging server system 110 provides server-side functionality via the network 106 to a particular messaging client application 106. While certain functions of the messaging system 100 are described herein as being performed by either a messaging client application 106 or by the messaging server system 110, it will be appreciated that the location of certain functionality either within the messaging client application 106 or the messaging server system 110 is a design choice, example, it may be technically preferable to initially deploy certain technology and functionality within the messaging server system 110, but to later migrate this technology and functionality to the messaging client application 106 where a client device 102 has a sufficient processing capacity.

The messaging server system 110 supports various services and operations that are provided to the messaging client application 106. Such operations include transmitting data to, receiving data from, and processing data generated by the messaging client application 106. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 106.

Turning now specifically to the messaging server system 110, an Application Program Interface (API) server 112 is coupled to, and provides a programmatic interface to, an application server 114. The application server 114 is communicatively coupled to a database server 120, which facilitates access to a database 122 in which is stored data associated with messages processed by the application server 114.

The Application Program Interface (API) server 112 receives and transmits message data (e.g., commands and message payloads) between the client device 102 and the application server 114. Specifically, the Application Program Interface (API) server 112 provides a set of interfaces (e.g., routines and protocols) that can be called or queried by the messaging client application 106 in order to invoke functionality of the application server 114. The Application Program Interface (API) server 112 exposes various functions supported by the application server 114, including account registration, login functionality, the sending of messages, via the application server 114, from a particular messaging client application 106 to another messaging client application 106, the sending of media files (e.g., images or video) from a messaging client application 106 to the messaging server application 116, and for possible access by another messaging client application 106, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 106).

The application server 114 hosts a number of applications and subsystems, including a messaging server application 116, image processing system 118, social network system 124, gaming application platform 126, avatar processing system 128 and a cross platform digital identity system 130. The messaging server application 116 implements a number of message processing technologies and functions, particularly related to the aggregation and other processing of content (e.g., textual and multimedia content) included in messages received from multiple instances of the messaging client application 106. As will be described in further detail, the text and media content from multiple sources may be aggregated into collections of content (e.g., called stories or galleries). These collections are then made available, by the messaging server application 116, to the messaging client application 106. Other processor and memory intensive processing of data may also be performed server-side by the messaging server application 116, in view of the hardware requirements for such processing.

The application server 114 also includes an image processing system 118 that is dedicated to performing various image processing operations, typically with respect to images or video received within the payload of a message at the messaging server application 116.

The social network system 124 supports various social networking functions services, and makes these functions and services available to the messaging server application 116. To this end, the social network system 124 maintains and accesses an entity graph within the database 122. Examples of functions and services supported by the social network system 124 include the identification of other users of the messaging system 100 with which a particular user has relationships or is "following", and also the identification of other entities and interests of a particular user.

The application server 114 is communicatively coupled to a database server 120, which facilitates access to a database 122 in which is stored data associated with messages processed by the messaging server application 116.

Figure 2:
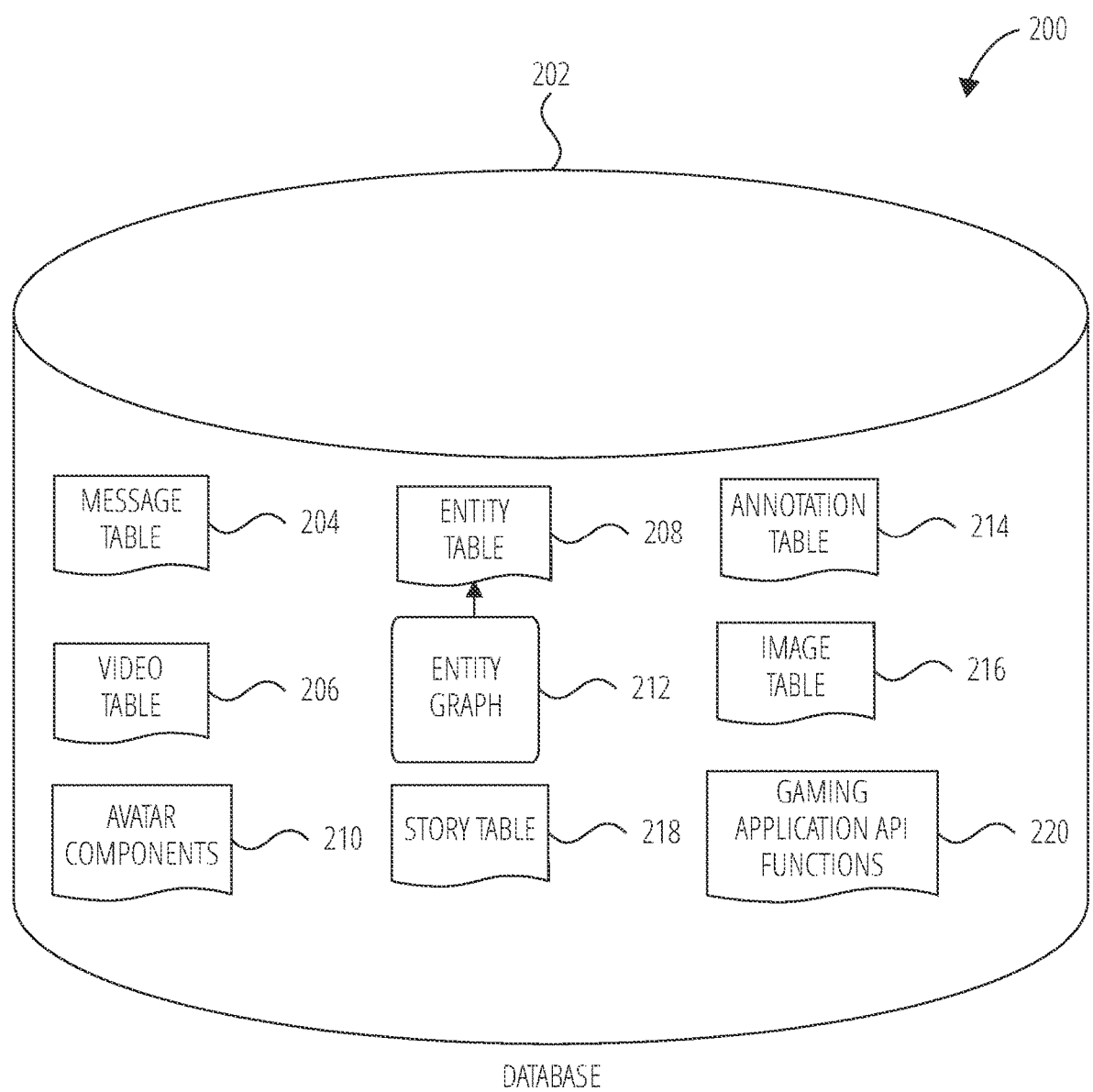
FIG. 2 is a schematic diagram illustrating data which may be stored in the database of a messaging server system, according to example embodiments.

FIG. 2 is a schematic diagram illustrating data structures 200 which may be stored in the database 220 of the messaging server system 110, according to certain example embodiments. While the content of the database 220 is shown to comprise a number of tables, it will be appreciated that the data could be stored in other types of data structures (e.g., as an object-oriented database).

The database 220 includes message data stored within a message table 218. The entity table 202 stores entity data, including an entity graph 204. Entities for which records are maintained within the entity table 202 may include individuals, corporate entities, organizations, objects, places, events, etc. Regardless of type, any entity regarding which the messaging server system 110 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization) interested-based or activity-based, merely for example.

Message table 218 may store a collection of conversations between a user and one or more friends or entities. Message table 218 may include various attributes of each conversation, such as the list of participants, the size of the conversation (e.g., number of users and/or number of messages), the chat color of the conversation, a unique identifier for the conversation, and any other conversation related feature(s). Information from message table 218 may be provided in limited form and on a limited basis to a given web-based gaming application based on functions of the messaging client application 106 invoked by the web-based gaming application.

The database 220 also stores annotation data, in the example form of filters, in an annotation table 216. Filters for which data is stored within the annotation table 216 are associated with and applied to videos (for which data is stored in a video table 212) and/or images (for which data is stored in an image table 208). Filters, in one example, are overlays that are displayed as overlaid on an image or video during presentation to a recipient user. Filters may be of varies types, including user-selected filters from a gallery of filters presented to a sending user by the messaging client application 106 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 106, based on geolocation information determined by a GPS unit of the client device 102. Another type of filer is a data filer, which may be selectively presented to a sending user by the messaging client application 106, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 212 stores video data which, in one embodiment, is associated with messages for which records are maintained within the message table 218. Similarly, the image table 208 stores image data associated with messages for which message data is stored in the entity table 202. The entity table 202 may associate various annotations from the annotation table 216 with various images and videos stored in the image table 208 and the video table 212.

Avatar components 214 stores various components in different levels of detail. Avatar processing system 128 accesses an avatar component in a first level of detail that is stored in avatar components 214, reduces the level of detail, and stores the avatar component in the second level of detail in avatar components 214. Avatar components 214 may store previously assembled avatars in first and/or second levels of detail. Avatar components 214 stores an association between the first and second levels of detail of various components with their corresponding avatars. For example, a given avatar may be associated with both the first level of detail components and the second level of detail components. Namely, an avatar skeleton in first and second levels of detail may be associated with a common avatar identifier.

Gaming application API functions 210 stores a number of functions of the SDK stored on gaming application platform 126. The gaming application API functions 210 stores the code that is executed when a given function of the API is invoked by the web-based gaming application, or the messaging client application 106, or messaging application emulator.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the user interface of the messaging client application 106 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 106, to contribute content to a particular live story. The live story may be identified to the user by the messaging client application 106, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
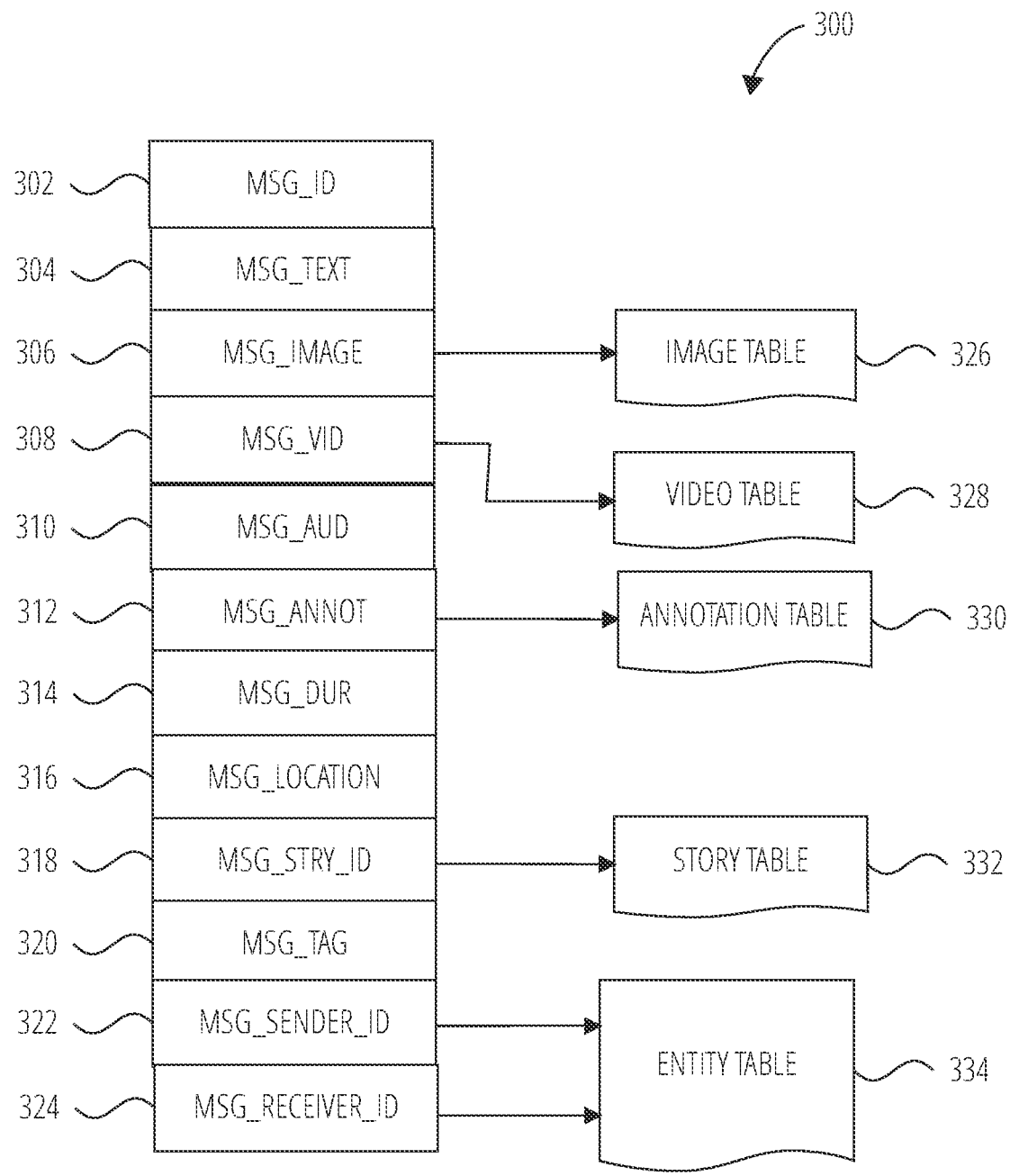
FIG. 3 is a schematic diagram illustrating a structure of a message generated by a messaging client application for communication, according to example embodiments.

FIG. 3 is a schematic diagram illustrating a structure of a message 300, according to some in some embodiments, generated by a messaging client application 106 for communication to a further messaging client application 106 or the messaging server application 116. The content of a particular message 300 is used to populate the message table 218 stored within the database 122, accessible by the messaging server application 116. Similarly, the content of a message 300 is stored in memory as "in-transit" or "in-flight" data of the client device 102 or the application server 114. The message 300 is shown to include the following components:

- A message identifier 302: a unique identifier that identifies the message 300,
- A message text payload 306: text, to be generated by a user via a user interface of the client device 102 and that is included in the message 300.
- A message image payload 308: image data, captured by a camera component of a client device 102 or retrieved from a memory component of a client device 102, and that is included in the message 300.
- A message video payload 312: video data, captured by a camera component or retrieved from a memory component of the client device 102 and that is included in the message 300.
- A message audio payload 316: audio data, captured by a microphone or retrieved from a memory component of the client device 102, and that is included in the message 300.
- A message annotations 320: annotation data (e.g., filters, stickers or other enhancements) that represents annotations to be applied to message image payload 308, message video payload 312, or message audio payload 316 of the message 300.
- A message duration parameter 324: parameter value indicating, in seconds, the amount of time for which content of the message (e.g., the message image payload 308, message video payload 312, message audio payload 316) is to be presented or made accessible to a user via the messaging client application 106.
- A message geolocation parameter 326: geolocation data (e.g., latitudinal and longitudinal coordinates) associated with the content payload of the message. Multiple message geolocation parameter 326 values may be included in the payload, each of these parameter values being associated with respect to content items included in the content (e.g., a specific image into within the message image payload 308, or a specific video in the message video payload 312).
- A message story identifier 328: identifier values identifying one or more content collections (e.g., "stories") with which a particular content item in the message image payload 308 of the message 300 is associated. For example, multiple images within the message image payload 308 may each be associated with multiple content collections using identifier values.
- A message tag 330: each message 300 may be tagged with multiple tags, each of which is indicative of the subject matter of content included in the message payload. For example, where a particular image included in the message image payload 308 depicts an animal (e.g., a lion), a tag value may be included within the message tag 330 that is indicative of the relevant animal. Tag values may be generated manually, based on user input, or may be automatically generated using, for example, image recognition.
- A message sender identifier 332: an identifier (e.g., a messaging system identifier, email address, or device identifier) indicative of a user of the client device 102 on which the message 300 was generated and from which the message 300 was sent
- A message receiver identifier 334: an identifier (e.g., a messaging system identifier, email address, or device identifier) indicative of a user of the client device 102 to which the message 300 is addressed.

The contents (e.g., values) of the various components of message 300 may be pointers to locations in tables within which content data values are stored. For example, an image value in the message image payload 308 may be a pointer to (or address of) a location within an image table 314. Similarly, values within the message video payload 312 may point to data stored within a video table 318, values stored within the message annotations 320 may point to data stored in an annotation table 322, values stored within the message story identifier 328 may point to data stored in a story table 310, and values stored within the message sender identifier 332 and the message receiver identifier 334 may point to user records stored within an entity table 304.

Figure 4:
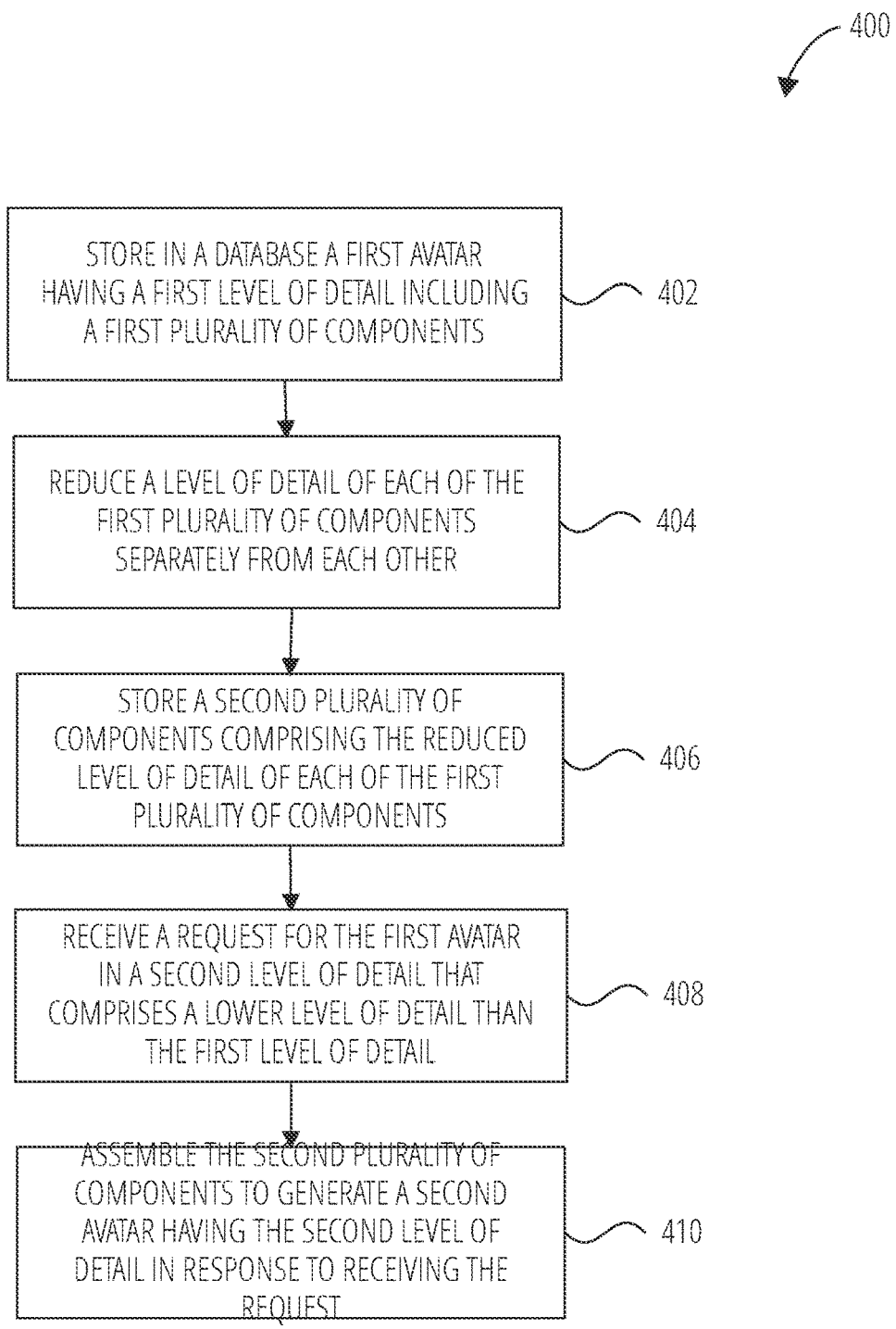
FIG. 4 is a flowchart illustrating example operations of an avatar processing system, according to example embodiments.

FIG. 4 is a flowchart illustrating example operations of the messaging application in performing process 400, according to some example embodiments. The process 400 may be embodied in computer-readable instructions for execution by one or more processors such that the operations of the process 400 may be performed in part or in whole by the functional components of the messaging server system 110; accordingly, the process 400 is described below by way of example with reference thereto. However, in other embodiments at least some of the operations of the process 400 may be deployed on various other hardware configurations. The process 400 is therefore not intended to be limited to the messaging server system 110 and can be implemented in whole, or in part, by any other component.

At operation 402, a first avatar having a first level of detail including a first plurality of components is stored in a database. For example, avatar processing system 128 stores an avatar in a first level of detail in avatar components 214. The avatar may be stored in avatar components 214 in already assembled form in which all of the avatar components (e.g., rig, model, and textures) in the first level of detail are already combined. Alternatively, the components in the first level of detail of the avatar may be stored separately to be assembled into a complete avatar at a later time.

At operation 404, a level of detail of each of the first plurality of components is reduced separately from each other. For example, avatar processing system 128 obtains a first component from the first avatar (e.g., a rig) and reduces the level of detail of the obtained first component separately from a second component (e.g., an avatar model). Reducing the level of detail of all the components of the first avatar generates a second plurality of components in a second level of detail. For example, the avatar rig (skeleton) in a first level of detail having 216 bones can be reduced to an avatar rig in a second level of detail having 16 bones. As another example, the avatar model in a first level of detail having 10,000 triangles can be reduced to a model in a second level of detail having 2000 triangles.

At operation 406, a second plurality of components is stored comprising the reduced level of detail of each of the first plurality of components. For example, avatar processing system 128 stores the reduced level of detail components as the second plurality of components in avatar components 214. Avatar processing system 128 associates the reduced level of detail components with the same avatar identifier in the first level of detail. For example, the avatar in the first level of detail may be associated with a given unique identifier (e.g., a unique name or number) and the reduced level of detail components may be associated with the same unique identifier. In particular, a database may store a reference to the reduced level of detail components for the unique avatar identifier and may store a reference to the assembled avatar in the first level of detail.

At operation 408, a request for the first avatar in a second level of detail that comprises a lower level of detail than the first level of detail is received. For example, a game may request from gaming application platform 126 requests a given avatar in a specified (e.g., reduced) level of detail. The game may provide an identifier of the avatar and/or identifiers of each component in a list of components of an avatar being requested. In some implementations, the game may need to simultaneously present multiple avatars (e.g., eight different avatars). In this case, the game may request each of the avatars in a second level of detail from the gaming application platform 126. This allows the game to quickly and efficiently present and animate multiple three-dimensional avatars while preserving device resources for processing the game. In some implementations, the game may present simultaneously certain avatars in a first level of detail and certain other avatars in a second level of detail, for example, based on priority and/or based on identities of users. For example, a leader or the user may have an avatar presented among other avatars in a first level of detail that is greater than the level of detail in which the other avatars are presented. The game may provide identities of all the avatars it needs to present simultaneously to gaming application platform 126 including a specific level of detail of each avatar. The gaming application platform 126 may then communicate with the avatar processing system 128 to retrieve the avatars in the different levels of detail for the game to simultaneously present.

At operation 410, the second plurality of components is assembled to generate a second avatar having the second level of detail in response to receiving the request. For example, the gaming application platform 126 may communicate with avatar processing system 128 the request for the avatar in the reduced level of detail. Avatar processing system 128 retrieves the components in the requested level of detail (e.g., the second level of detail) and assembles them into an avatar that is in a second level of detail. The avatar processing system 128 provides the avatar in the second level of detail to the gaming application platform 126, which then provides the requested avatar to the game.

Figure 5:
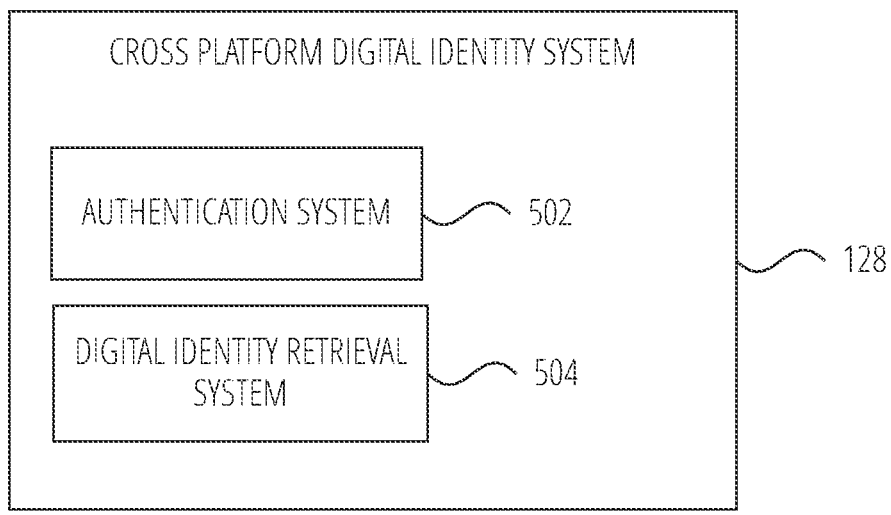
FIG. 5 is a system diagram illustrating functional components of a cross platform digital identity system, according to some example embodiments.

As shown in in FIG. 5, the cross platform digital identity system 130 may comprise an authentication system 502 and a digital identity retrieval system 504.

The authentication system 502 matches a digital identity of a user in a gaming application with a digital identity of the user within the messaging client application 106. In one example, the authentication system 502 requires a user to input authentication credentials associated with the messaging client application 106 directly within a user interface of the gaming application. The authentication credentials may comprise a username and a password. Each of the username and password may require a series of alphanumeric characters.

In one embodiment, the authentication system 502 may require authentication of the user using the messaging client application 106. The authentication system 502 may provide an image or code obtained from the one or more database 122 and display the image or code on a user interface within the gaming application. In some examples, the image or a code is an optical barcode unique to the user. The optical barcode may be displayed on a first user device. The user may use the messaging client application 106 on a second user device, to scan the image or code to authenticate her credentials. The messaging client application 106 may require additional input from the user to complete authentication. The additional input may be in the form of alphanumeric characters received by a user interface of the messaging client application 106 on the second user device. In one example, the additional input may be received by the first user device.

The digital identity retrieval system 504 retrieves the avatar associated with the user after the user has been authenticated by the authentication system 502. In one example, the digital identity retrieval system 504 obtains the avatar from one or more of the avatar processing system 128 and the gaming application platform 126. The digital identity retrieval system 504 loads the avatar into a game engine and converts the avatar into a format recognizable by the specific game engine. A game engine is a software development environment used to construct game. A single game engine can be used to develop game applications that can be run on multiple game platforms. In one example, the digital identity retrieval system 504 converts the avatar into a runtime file format used by a game engine to describe three-dimensional objects. This allows the cross platform digital identity system 130 to supply the most recent avatar associated with the user to multiple gaming platforms. In another example, the cross platform digital identity system 130 allows the specific game engine to further customize the avatar.

The following paragraphs illustrate a cross platform digital identity system 130 within a user interface of a gaming engine.

Figure 6:
FIG. 6 is a diagrammatic illustration of a cross platform digital identity system within a user interface of a game engine, according to some example embodiments.

FIG. 6 is a diagrammatic illustration of an empty scene 600 within a user interface of a gaming engine, according to some example embodiments. A user may request the cross platform digital identity system 130 to retrieve her avatar for use within the gaming engine by selection of a user interface element within the user interface of the gaming engine.

Figure 7:
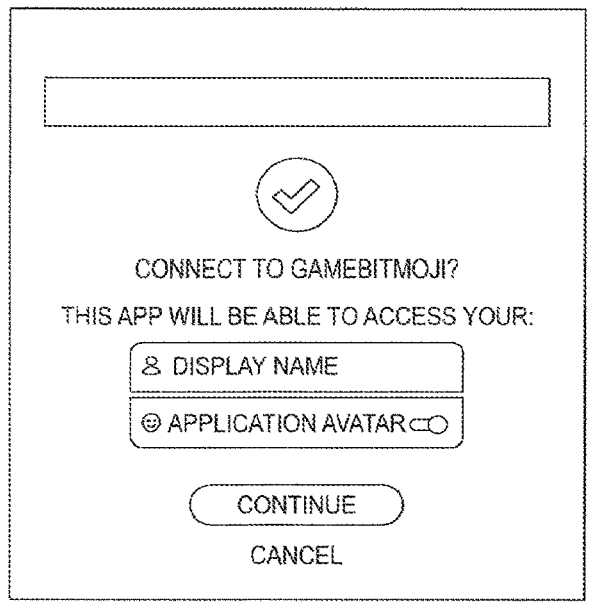
FIG. 7 is a diagrammatic illustration of a cross platform digital identity system within a user interface of a game engine, according to some example embodiments.

FIG. 7 is a diagrammatic illustration of a login screen 700 displayed by the cross platform digital identity system 130 within a user interface of a gaming engine, according to some example embodiments. The login screen allows the user to select a user interface element which will allow the gaming application to access the user's avatar.

Figure 8:
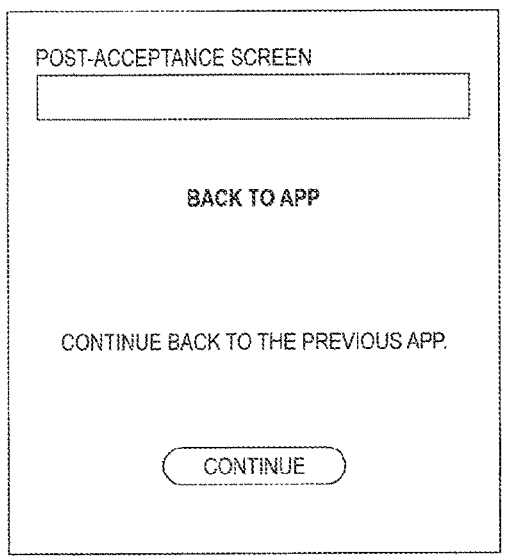
FIG. 8 is a diagrammatic illustration of a cross platform digital identity system within a user interface of a game engine, according to some example embodiments.

FIG. 8 is a diagrammatic illustration of a post-acceptance screen displayed by the cross platform digital identity system 130 within a user interface of a gaming engine, according to some example embodiments. The post-acceptance screen verifies that the cross platform digital identity system 130 has been authorized to access and use the user's avatar.

Figure 9:
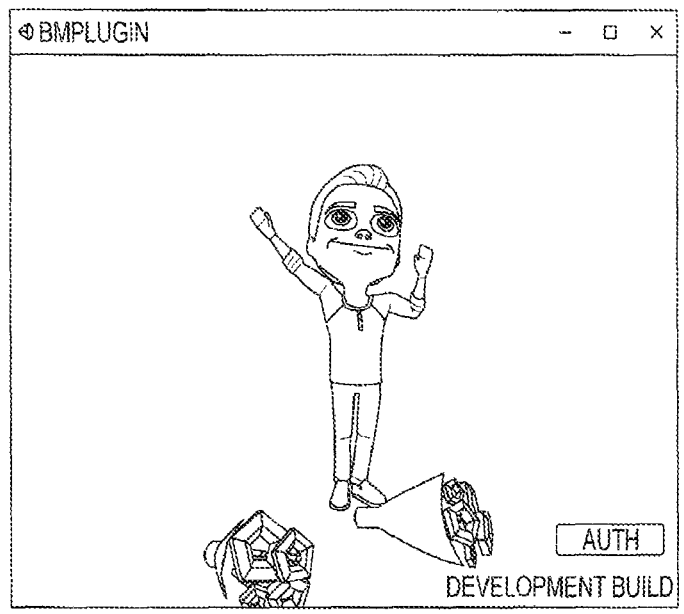
FIG. 9 is a diagrammatic illustration of a cross platform digital identity system within a user interface of a game engine, according to some example embodiments.

FIG. 9 is a diagrammatic illustration of a user's avatar loaded into a user interface of a gaming engine, according to some example embodiments.

Figure 10:
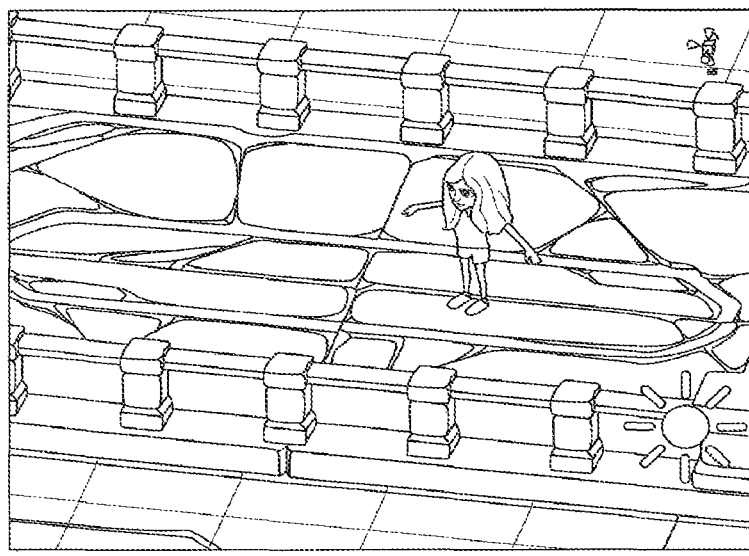
FIG. 10 is a diagrammatic illustration of a cross platform digital identity system within a user interface of a game engine, according to some example embodiments.

FIG. 10 is a diagrammatic illustration of a user's avatar loaded into a pre-existing game engine environment.

Figure 11:
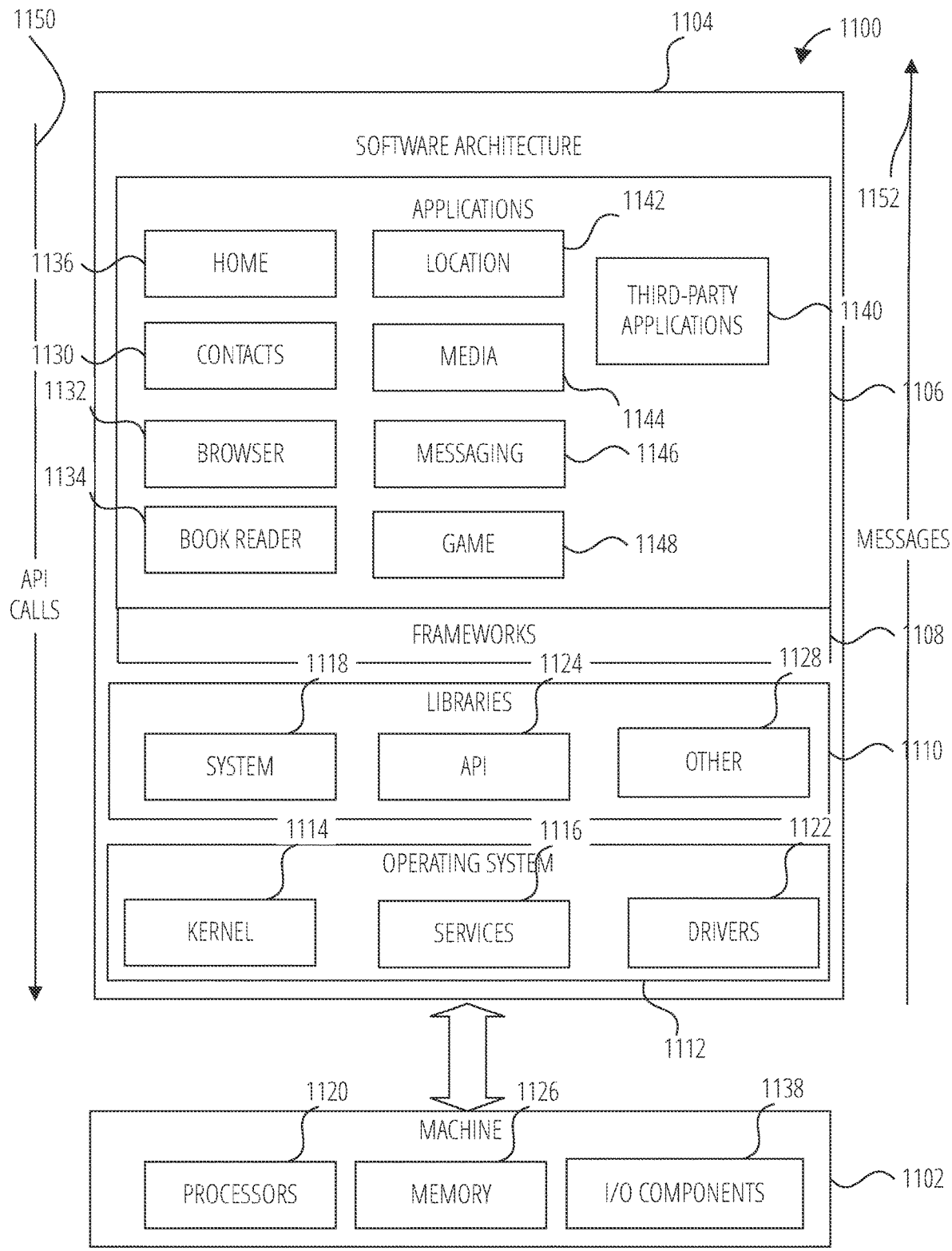
FIG. 11 is block diagram showing a software architecture within which the present disclosure may be implemented, in accordance with some example embodiments.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1110 provide a low-level common infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a high-level common infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example embodiment, the applications 1106 may include a home application 1136, a contacts application 1130, a browser application 1132, a book reader application 1134, a location application 1142, a media application 1144, a messaging application 1146, a game application 1148, and a broad assortment of other applications such as third-party applications 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party applications 1140 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1140 can invoke the API calls 1150 provided by the operating system 1112 to facilitate functionality described herein.

Figure 12:
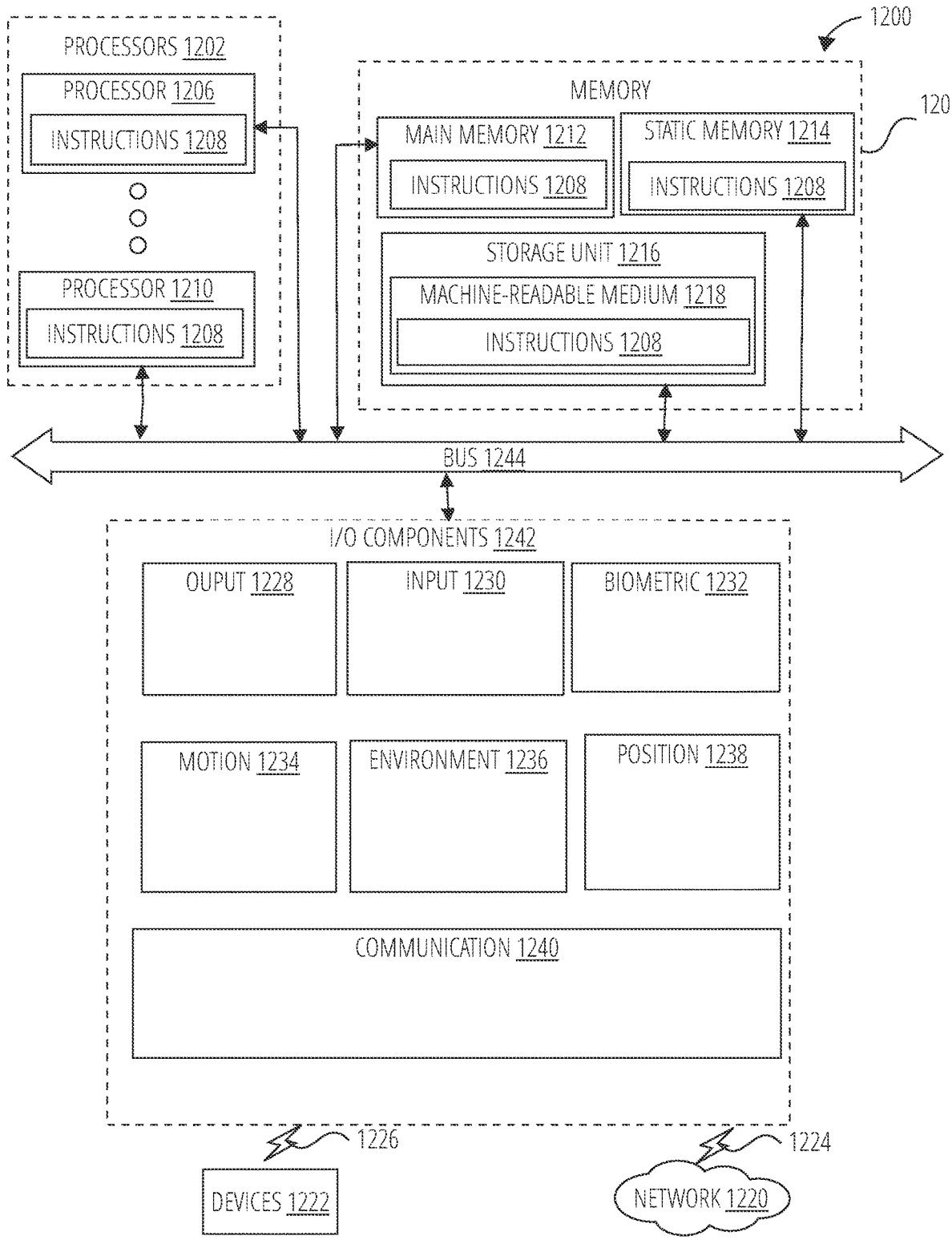
FIG. 12 is a diagrammatic representation of a machine, in the form of a computer system within which a set of instructions may be executed for causing the machine to perform any one or more of the methodologies discussed, in accordance with some example embodiments.
Figure 13:
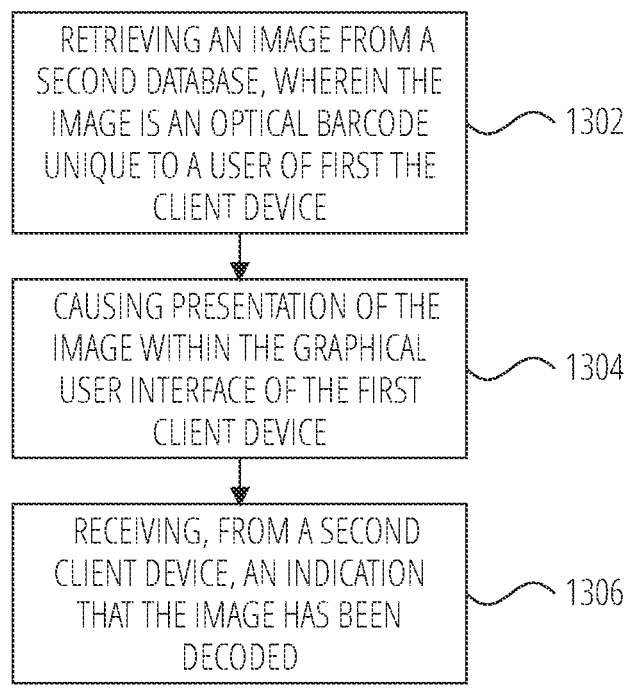
FIG. 13 is an illustration of a flowchart of a method for authenticating a request to display an avatar, in accordance with one example.

FIG. 12 is a diagrammatic representation of a machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines, in a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include processors 1202, memory 1204, and I/O components 1242, which may be configured to communicate with each other via a bus 1244. In an example embodiment, the processors 1202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1206 and a processor 1210 that execute the instructions 1208. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single core, a single processor with multiple cores (e.g., a multi-core processor), multiple processors with a single core, multiple processors with multiples cores, or any combination thereof.

The memory 1204 includes a main memory 1212, a static memory 1214, and a storage unit 1216, both accessible to the processors 1202 via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors 1202 (e.g., within the processor's cache memory), or any suitable combination thereof, during execution thereof by the machine 1200.

The I/O components 1242 may include a wide variety of components to receive input, provide output, produce output, transmit information, exchange information, capture measurements, and so on. The specific I/O components 1242 that are included in a particular machine will depend on the type of machine. For example, portable machines such as mobile phones may include a touch input device or other such input mechanisms, while a headless server machine will likely not include such a touch input device. It will be appreciated that the I/O components 1242 may include many other components that are not shown in FIG. 12. In various example embodiments, the I/O components 1242 may include output components 1228 and input components 1230. The output components 1228 may include visual components (e.g., a display such as a plasma display panel (PDP), a light emitting diode (LEI)) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1242 may include biometric components 1232, motion components 1234, environmental components 1236, or position components 1238, among a wide array of other components. For example, the biometric components 1232 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 include acceleration sensor components (e.g., accelerometer), gravitation sensor components, rotation sensor components (e.g., gyroscope), and so forth. The environmental components 1236 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1242 further include communication components 1240 operable to couple the machine 1200 to a network 1220 or devices 1222 via a coupling 1224 and a coupling 1226, respectively. For example, the communication components 1240 may include a network interface component or another suitable device to interface with the network 1220. In further examples, the communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1222 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geolocation, location via Wi-Fi® signal triangulation, location via detecting an NFC beacon signal that may indicate a particular location, and so forth.

The various memories (e.g., memory 1204, main memory 1212, static memory 1214, and/or memory of the processors 1202) and/or storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed embodiments.

The instructions 1208 may be transmitted or received over the network 1220, using a transmission medium, via a network interface device (e.g., a network interface component included in the communication components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

What is claimed is:

1. A method comprising:
    storing, by one or more processors, an avatar in a database, the avatar comprising a first set of components in a first level of detail in a fully assembled form;
    receiving a request to display the avatar with a facial expression within a graphical user interface of a first client device in a reduced level of detail, wherein the request comprises a lesser number of triangles and vertices in a geometric model of the avatar;
    retrieving each component in the first set of components individually in the reduced level of detail from the database;
    retrieving a sequence of facial textures corresponding to the facial expression in the reduced level of detail from the database;
    generating a modified avatar, wherein generating the modified avatar comprises:
        assembling the first set of components in the reduced level of detail,
        assembling the sequence of facial textures in the reduced level of detail, and
        converting the assembled first set of components in the reduced level of detail into a runtime file format describing three-dimensional objects to create a modified avatar;
    transmitting the modified avatar to a first client device; and
    causing presentation of the modified avatar within the graphical user interface of the first client device, wherein the modified avatar being presented is animated using the sequence of facial textures.

2. The method of claim 1, wherein the avatar is a three-dimensional avatar.

3. The method of claim 1, wherein the request to display the avatar is received from a gaming application.

4. The method of claim 1, wherein authenticating the request further comprises:
    retrieving an image from a second database, wherein the image is an optical barcode unique to a user of first the client device;
    causing presentation of the image within the graphical user interface of the first client device; and
    receiving, from a second client device, an indication that the image has been decoded.

5. The method of claim 4, wherein authenticating the request further comprises:
    receiving, from the second client device, further authentication credentials, the further authentication credentials comprising alphanumeric characters associated with the user.

6. The method of claim 1, further comprising:
    authenticating the request based on user data associated with the avatar.

7. The method of claim 1, further comprising:
    causing presentation of the avatar in a gaming application.

8. The method of claim 1, wherein the reduced level of detail is a lower level of detail than the first level of detail.

9. The method of claim 1, further comprising storing the first set of components in the reduced level of detail in the database.

10. The method of claim 1, wherein animating the modified avatar comprises animating a facial expression of the modified avatar.

11. The method of claim 1, wherein animating the modified avatar comprises:
    retrieving the sequence of facial textures in the reduced level of detail; and
    assembling the sequence of facial textures one at a time to animate an expression.

12. A system comprising:
    a processor configured to perform operations comprising:
    storing an avatar in a database, the avatar comprising a first set of components in a first level of detail in a fully assembled form;
    receiving a request to display the avatar with a facial expression within a graphical user interface of a first client device in a reduced level of detail, wherein the request comprises a lesser number of triangles and vertices in a geometric model of the avatar;
    retrieving each component in the first set of components individually in the reduced level of detail from the database;
    retrieving a sequence of facial textures corresponding to the facial expression in the reduced level of detail from the database;
    generating a modified avatar, wherein generating the modified avatar comprises:
        assembling the first set of components in the reduced level of detail,
        assembling the sequence of facial textures in the reduced level of detail, and
        converting the assembled first set of components in the reduced level of detail into a runtime file format describing three-dimensional objects to create a modified avatar;
    transmitting the modified avatar to a first client device; and
    causing presentation of the modified avatar within the graphical user interface of the first client device, wherein the modified avatar being presented is animated using the sequence of facial textures.

13. The system of claim 12, wherein the avatar is a three-dimensional avatar.

14. The system of claim 12, wherein the request to display the avatar is received from a gaming application.

15. The system of claim 12, wherein authenticating the request further comprises:

retrieving an image from a second database, wherein the image is an optical barcode unique to a user of first the client device;

causing presentation of the image within the graphical user interface of the first client device; and receiving, from a second client device, an indication that the image has been decoded.

16. The system of claim 15, wherein authenticating the request further comprises:

receiving, from the second client device, further authentication credentials, the further authentication credentials comprising alphanumeric characters associated with the user.

17. The system of claim 12, wherein the operations further comprise:

authenticating the request in a messaging application.

18. The system of claim 12, wherein the operations further comprise:

causing presentation of the avatar in a gaming application.

19. A non-transitory computer-readable storage medium that includes instructions that, when executed by one or more processors of a machine, cause the machine to perform operations comprising:

storing an avatar in a database, the avatar comprising a first set of components in a first level of detail in a fully assembled form;

receiving a request to display the avatar with a facial expression within a graphical user interface of a first client device in a reduced level of detail, wherein the request comprises a lesser number of triangles and vertices in a geometric model of the avatar;

retrieving each component in the first set of components individually in the reduced level of detail from the database;

retrieving a sequence of facial textures corresponding to the facial expression in the reduced level of detail from the database;

generating a modified avatar, wherein generating the modified avatar comprises:

assembling the first set of components in the reduced level of detail, assembling the sequence of facial textures in the reduced level of detail, and converting the assembled first set of components in the reduced level of detail into a runtime file format describing three-dimensional objects to create a modified avatar;

transmitting the modified avatar to a first client device; and causing presentation of the modified avatar within the graphical user interface of the first client device, wherein the modified avatar being presented is animated using the sequence of facial textures.

* * * * *